United States Patent [19]

Koerner

[11] Patent Number: 4,642,611

[45] Date of Patent: Feb. 10, 1987

[54] SOUND ENGINE

[76] Inventor: Andre F. Koerner, 11706 Nobililty Cir., Stafford, Tex. 77477

[21] Appl. No.: 542,053

[22] Filed: Oct. 14, 1983

[51] Int. Cl.[4] .......................... G01V 1/04; G01V 1/57; G08B 9/00

[52] U.S. Cl. .................................. 340/385; 116/22 A; 116/23; 340/384 R; 340/386

[58] Field of Search .................... 340/384 R, 385, 386; 116/17, 22 A, 23, 138; 84/1.04–1.09, DIG. 12, 1.14; 123/90.11, 24 A, 24 R, 38, 39, 435, 531; 324/175; 431/19

[56] References Cited

U.S. PATENT DOCUMENTS

| | | | |
|---|---|---|---|
| 2,574,591 | 10/1948 | Rudd | 84/1.04 |
| 2,917,736 | 12/1959 | Marotta . | |
| 3,048,816 | 8/1962 | Lubnow | 116/22 A |
| 3,113,304 | 12/1963 | Lindley . | |
| 3,412,394 | 11/1968 | Lewis et al. . | |
| 3,549,775 | 12/1970 | Kaminsky . | |
| 3,897,195 | 7/1975 | Finch | 116/22 A |
| 4,020,803 | 5/1977 | Thuren et al. | 123/90.11 X |
| 4,224,570 | 9/1980 | Meserow | 324/175 |
| 4,356,753 | 11/1982 | Galley | 84/1.04 |
| 4,387,696 | 6/1983 | Yogo et al. | 123/531 |
| 4,463,709 | 8/1984 | Pluequet | 60/321 |

FOREIGN PATENT DOCUMENTS

| | | | |
|---|---|---|---|
| 1526308 | 9/1978 | United Kingdom | 116/23 |

*Primary Examiner*—James L. Rowland
*Assistant Examiner*—Brent A. Swarthout
*Attorney, Agent, or Firm*—Dula, Shields & Egbert

[57] ABSTRACT

A sound engine comprising a firing chamber, an output horn, an igniter, a valve system, an electromagnetic control device, and a source of electrical signal impulses. The igniter is mounted about the firing chamber. The valve system is arranged generally adjacent the firing chamber for permitting the controlled separate introduction of fuel and air into the firing chamber. The valve means comprises a source of fuel, a source of air, a fuel shuttle valve, and an air valve. The fuel shuttle valve and the air valve are integrally connected. The electromagnetic control device is connected to the valving system for causing movement of the valving system in response to electrical signal impulses. The electromagnetic control device includes voice coils, magnetic field windings, and a housing. An output area occurs relative to the firing chamber to permit sound output from the firing chamber. The output area includes suitable mounting flanges for attaching horns thereabout.

8 Claims, 3 Drawing Figures

SOUND ENGINE

TECHNICAL FIELD

The present invention relates to devices for the production of sound. More particularly, the present invention relates to combustion-type devices that produce sound through interaction with electromagnetic energy.

BACKGROUND ART

A number of prior art devices are known in which a sound output is obtainable by igniting apparatus generally similar to engine combustion chambers thus to give an explosive output. In most cases, these devices emit only a single sound and are not operable in synchronous relationship to electromagnetic energy. One system of this type is shown and described in R. J. Marotta, U.S. Pat. No. 2,917,736, issued on Dec. 15, 1959 for a "Pest Control Device". A similar device used to emit a single loud sound to repel birds, animals, or pests is shown and described in R. M. Lewis et al, U.S. Pat. No. 3,412,394, issued Nov. 19, 1968 for "Photocell Controlled Pest, Bird, and Animal Chaser". In that system again the actuation of the device is controlled by a photocell with a single activation of the combustion chamber resulting. A still further sound emitting device is shown in F. M. Lindley's U.S. Pat. No. 3,113,304, issued on Dec. 3, 1963, for a "Pest Control Device".

The present invention is generally based upon the concept described in U.S. Pat. No. 4,356,753, issued on Nov. 2, 1982 and entitled "Musical Electromagnetic Analog Synthesizer Controlled Rocket Engine". This device was invented by Paul L. Galley, and assigned to Andre F. Koerner, the present inventor. This assignment is recorded at Reel 4160, Frames 568–570 in the U.S. Patent and Trademark Office under a date of Aug. 22, 1983. This patent describes a musical instrument combination including a rocket engine type combustion chamber and a system for firing it either by a single drum beat control or by variable frequency control pulses. The effect achieved by the rocket engine output sound is similar to that of a pipe organ and resonator and further is of a pitch controllable by the barrel length and diameter of the rocket engine chamber exhaust structure. This device, however, was not made particularly adaptable to industrial applications. Futhermore, the device as described in this patent emitted a sound of principally low frequencies and for only a short period of time. The present invention is a distinct variation on the concept described in the above-identified patent.

It is an object of the present invention to provide a sound engine whose sound output, specifically amplitude and frequency, may be accurately controlled.

It is an object of the present invention to provide a sound engine that is capable of producing extremely loud sounds in relation to the size of the sound generator package.

It is another object of the present invention to provide a sound engine that is capable of producing a wide range of sound frequencies including those in excess of 2,000 Hertz.

It is another object of the present invention to produce an extremely loud sound while using relatively small amounts of electrical power.

It is another object of the present invention to provide a sound engine that is capable of a variety of industrial applications such as cleaning systems, alarm systems, and testing systems.

It is still a further object of the present invention to provide a sound engine that is capable of long-term operation.

These and other objects and advantages of the present invention will become apparent from a reading of the attached specification and appended claims.

SUMMARY OF THE INVENTION

The present invention is a sound engine comprising a firing chamber, an ignition source, a valve system, an electromagnetic control device, and a source of electrical impulses. The source of ignition is mounted generally about the firing chamber so as to be interactive with the interior of the firing chamber. The valve system is arranged generally adjacent to the firing chamber so as to permit the controlled separate introduction of fuel and gas into the firing chamber. The electromagnetic control device is connected to the valves so as to impart movement to the valves in response to electrical signal impulses received from the source of electrical signal impulses.

The firing chamber of the present invention is a generally cylindrical chamber having one open end. The open end of the firing chamber acts as an output area for the sound emitted from the firing chamber. Suitable horns or other attachments may be connected to this output area so as to control the sound output to a predetermined pitch or tone. This horn may be demountably attached to the chamber.

The valve system of the present invention comprises a fuel source, an air source, a fuel shuttle valve communicating with the fuel source, and an air valve communicating with the air source. The fuel shuttle valve causes the fuel to controllably pass toward the firing chamber. The air valve permits the air to controllably pass into the firing chamber. Both the fuel shuttle valve and the air valve are integrally connected. This valve system further includes a blowback control that communicates with the firing chabmer. This blowback control includes a piston integrally fastened about the shuttle valve. This blowback control serves to equalize pressures acting on the air valve. The valve system also includes a back pressure control that generally communicates with the air source. This back pressure control includes a passage extending within the valve system generally between the air valve and a piston integrally fastened about the shuttle valve. This back pressure control tends to equalize the air pressures within the valve system.

The electromagnetic control device comprises a voice coil connected to the valve system. This voice coil is responsive to the source of electrical signal impulses and is electrically connected thereto. The electromagnetic control device further comprises magnetic field windings arranged about the sound engine and acting on the voice coils so as to facilitate the movement of the voice coils in response to electrical signal impulses.

The sound engine of the present invention also incorporates the features of coolant systems generally extending within and throughout the sound engine. These cooling systems serve to control the temperatures of each of the components of the sound engine.

The sound engine of the present invention can easily be used as a general purpose loudspeaker or alarm siren in cases where an extremely loud sound is required. In addition, the projected response frequency of 2,000 Hertz or greater will enable the engine to greatly amplify the spoken words and/or music. A benefit of such a device is that the engine uses little electrical power to produce relatively great amounts of sound energy. The sound engine is particularly suitable in broadcasting sound in remote areas since it primarily uses a portable fuel supply and does not require great amounts of electrical energy.

An industrial application of the engine is the acoustic cleaning of a wide variety of parts. By creating loud resonant frequencies, loose particles can be "shaken" from certain objects. The particular cleaning application which may show significant promise is the acoustic cleaning of large electrostatic precipitator plates used in many coal-fired power plants and sawmills. Electrostatic precipitator systems are utilized to cleanse the fluegases of power plant boilers of soot and ash prior to discharge into the atmosphere or to filter the air in and around sawmills of sawdust. In such systems, particles are given an electric charge so as to adhere to large plates of opposite charge as they pass through a grid of many such plates. Periodically, these plates must be cleaned so as to renew the electrostatic precipitation process. Currently, a rather crude method of "thumpers" is employed to clean the plates. The "thumping" process uses hammers to stike the plate to shake the particles loose, thereby allowing them to fall off. The sound engine of the present invention may be more effective at cleaning such electrostatic precipitator plates by creating very loud resonant tones which cause the plates to vibrate and, thereby, remove the particles from the plates.

The sound engine of the present invention may also be used for sound and vibration testing (both nondestructive and destructive) of various structures and fabrications. Currently, such testing is limited to the relatively low volume/amplitudes that are currently feasible. The sound engine would allow a greater range of such testing since extreme volumes and a wide variety of frequencies may be obtained.

The sound engine of the present invention could also be adaptable as an acoustic weapon. The extreme volumes and ranges of frequencies that could be generated with the engine could potentially be used for the demolition and/or destruction of various structures and fabrications. In addition, such a sound engine could also be used as a device for incapacitating large numbers of persons.

A still further application of the present sound engine is as an underwater loudspeaker. This sound engine could serve as a useful communication device between surface personnel and divers. Furthermore, such a loudspeaker could be used to entice fish or other marine wildlife toward fishermen's nets or capture areas. Similarly, the sound engine of the present invention could be used to repel harmful marine wildlife from public beaches.

The various commercial and industrial uses of the present invention are virtually limitless. The present invention is applicable to any situation where very large amounts of controllable sound are required. The present invention is believed to produce sound not hereinbefore thought possible by such relatively small and inexpensive packages.

BRIEF DESRIPTION OF THE DRAWINGS

BEST MODE FOR CARRYING OUT THE INVENTION

Figure 1:
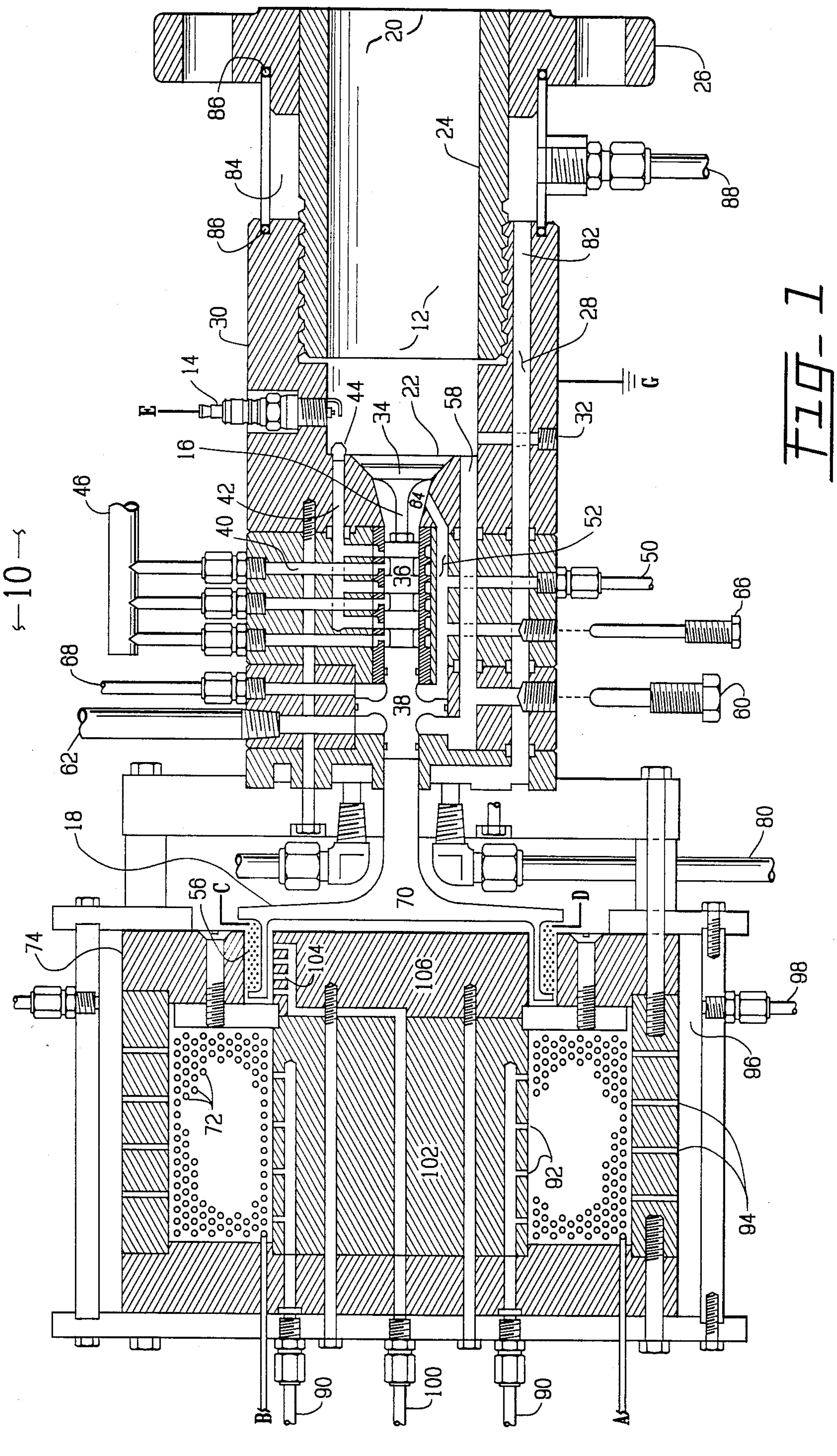
FIG. 1 is a cross-sectional view in side elevation of the sound engine of the present invention.

In FIG. 1, there is shown at 10 the sound engine of the present invention. The sound engine comprises a firing chamber 12, an igniter 14, a valving system 16, electromagnetic controls 18, and a sound output area 20. Each of these components interacts, upon the response to electrical signal impulses, to provide the amplified sound in accordance with the present invention.

Figure 2:
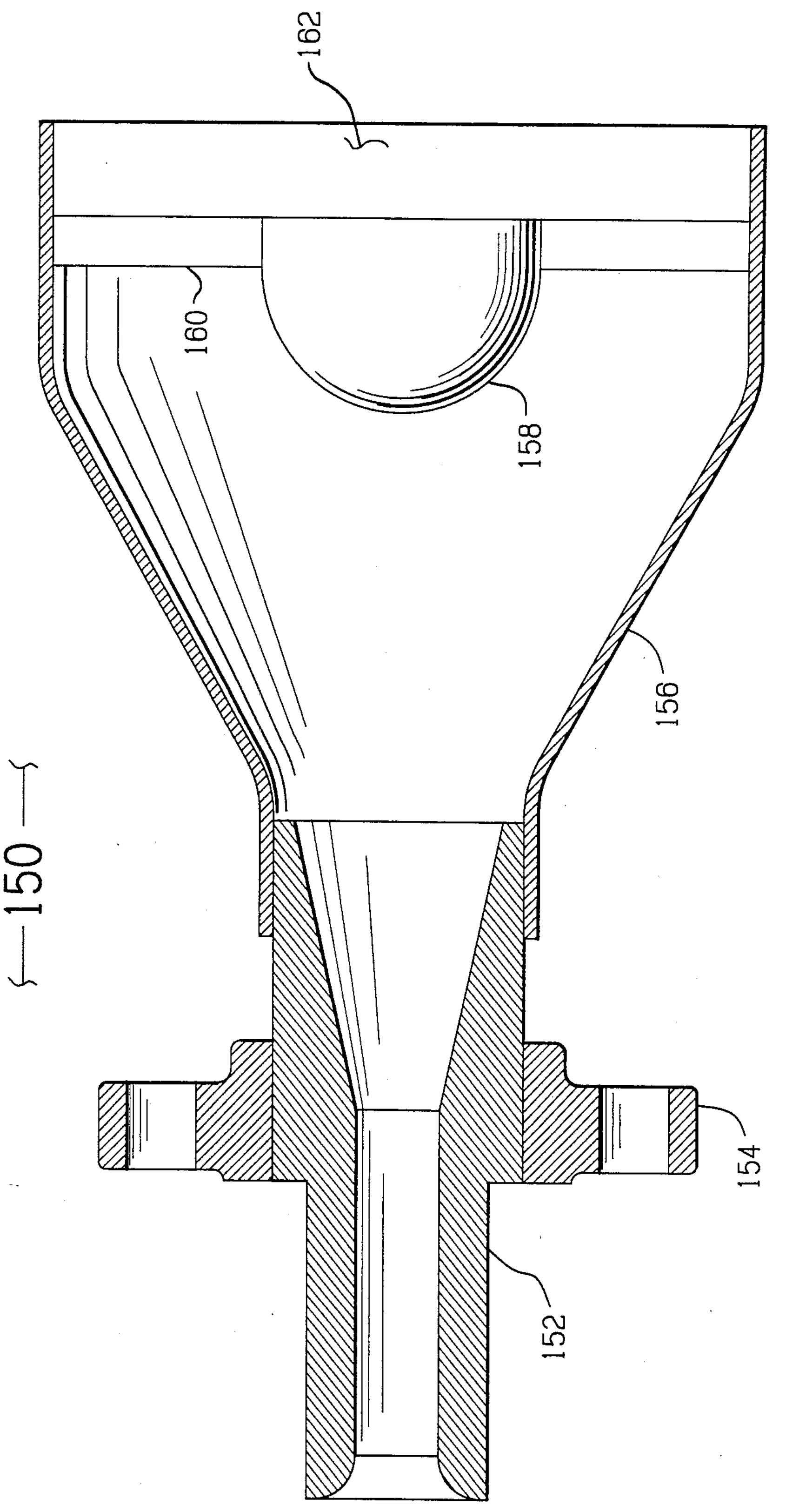
FIG. 2 is a cross-sectional view in side elevation of a typical output horn for attachment to the sound engine of the present invention.

Firing chamber 12 is a generally cylindrical area having one end open (sound output area 20) and the other end 22 generally adjacent valving system 16. Firing chamber 12 is formed by generally cylindrical interior of housing 30 and combustor discharge sleeve 24. At the end of the disharge sleeve 24, generally adjacent sound output area 20 is a mounting flange 26. Mounting flange 26 is fastened about the exterior diameter of discharge sleeve 24. Mounting flange 26 serves to receive any attachments or horns that may be mounted to the sound engine of the present invention. An illustration of such an attachment is shown in FIG. 2, and will be discussed hereinafter. A coolant distribution system 28 is provided adjacent to the firing chamber 12 for the purpose of controlling the temperatures of the sound engine.

Figure 3:
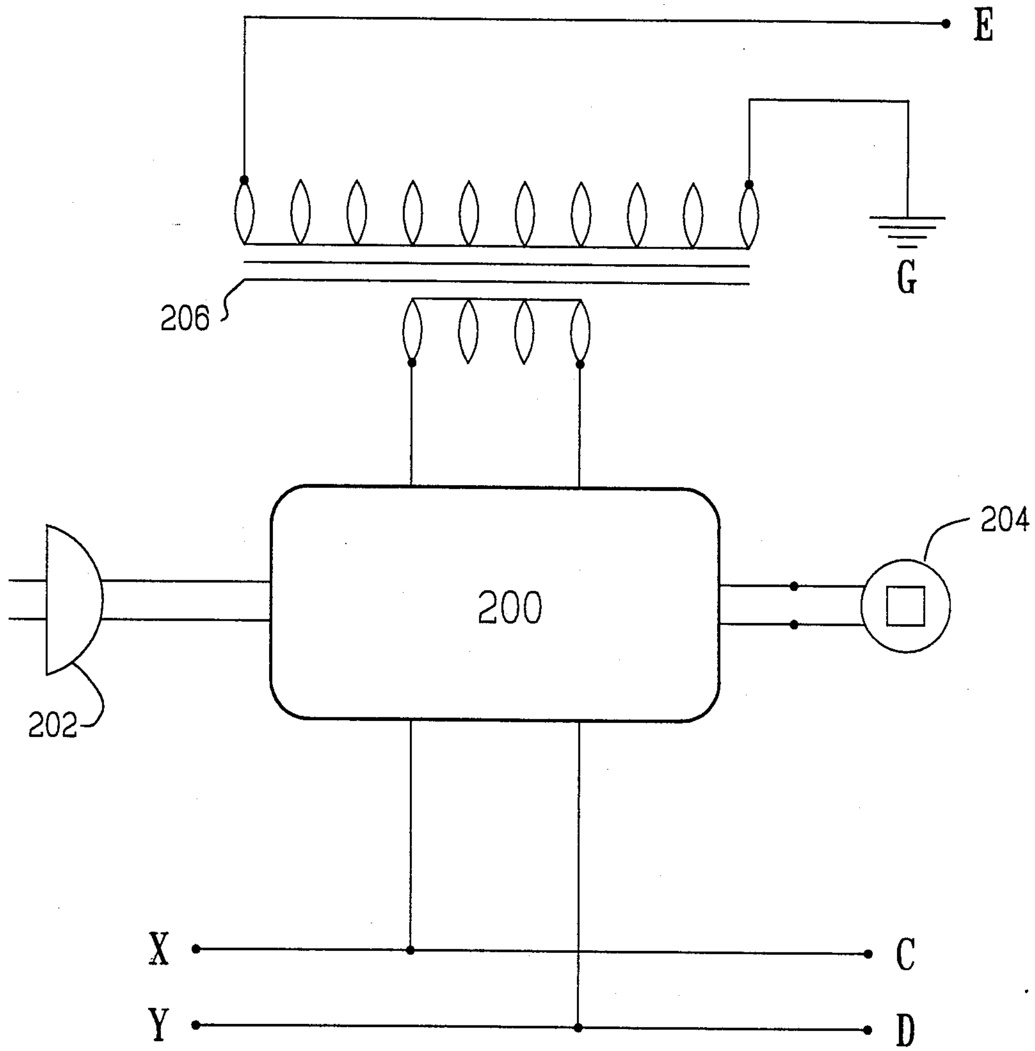
FIG. 3 is a schematical representation of the igniter firing control circuits as connected to the sound engine of the present invention.

Ignitor 14 is a spark plug that extends through a housing 30 into the interior of the firing chamber 12. Ignitor 14 is activated by suitable electrical connection E. With the proper electrical input, ignitor 14 can be fired as needed to properly activate and maintain the operation of the sound engine. It should be noted that upon extremely rapid firings, there may be no need for additional use of the ignitor 14. At such high levels of firings, a constant ignition state is maintained within the interior of the firing chamber 12. Under these conditions the sound engine is controlled by the flow of fuel and air into the firing chamber as effected by the valving system. A phototransistor is installed in port 32 in firing chamber 12. This phototransistor views the firing chamber 12 for the purpose of monitoring the spark plug firing and fuel/air mixture ignition. A detailed discussion of the spark plug firing control circuit and firing chamber monitor system is illustrated in FIG. 3 and described hereinafter.

The present invention incorporates a novel valving system 16 for permitting the controlled introduction of fuel and air into the firing chamber 12. Valving system 16 comprises main air valve 34, fuel shuttle valve 36, and back pressure/blowback piston 38. Each of these elements of the valving system are integrally fastened to each other so as to provide coordinated and controlled introduction of fuel and air into firing chamber 12. Main air valve 34 is fitted into the frustoconical opening ajdacent to the other end 22 of fring chamber 12. As can be seen in FIG. 1, air valve 34 moves longitudinally within this opening. The fuel shuttle valve 36 is fastened to the end of main air valve 34 opposite firing chamber 12.

Fuel shuttle valve 36 includes suitable detents that control the passage of fuel from fuel lines 40, through fuel passageway 42, and out through fuel injection tip 44. In this arrangement, as the air valve 34 moves toward firing chamber 12, grater amounts of fuel are passed from fuel lines 40 toward fuel injection tip 44. Fuel lines 40 are fed by fuel inlet manifold 46. Fuel inlet manifold 46 is in communication with a source of fuel. Suitable pumping means, not shown, are included within the present invention for passing the fuel from the fuel source into the valving system of the present invention.

Air is supplied to the firing chamber 12 through air inlet line 50. Air inlet line 50 passes the air into and through air passages 52. Depending on the position of air valves 34, the air injected through inlet line 50 will pass through air valve 34 into firing chamber 12 or will be retained on the opposite side of air valve 34 from the firing chamber 12.

A unique feature of the present invention is the inclusion of the back pressure/blowback piston 38. This piston 38 is attached to the voice coils 56, as described hereinafter. The purpose of the back pressure/blowback piston 38 is to balance the air pressure and combustion chamber pressure force on the main air valve 34 so as to require a minimal driving/control force to be supplied by the electromagnetic controls 18. The "blowback" arrangement taps a controlled amount of firing chamber pressure through passage 58. The pressure and flow is controlled with blowback adjusting screws 60. "Blowback" pressure is directed toward the rear face of piston 38 which tends to force the main air valve 34 open, thereby counteracting the combustion chamber pressure. Further control of blowback pressure on the rear face of piston 38 is provided by means of blowback relief ports 62 which may be suitably valved to permit the required flow of firing chamber pressure and combustion by-products.

Similarly, the "back pressure" arrangement uses a controlled portion of the entering air supply pressure to again balance pressure forces on the main air valve 34. Air entering through line 50 travels through passages 52 and into air chamber 64. This air pressure tends to force the main air valve 34 open. A relatively great amount of air pressure is required since this pressure must be comparable to the firing chamber pressure in order to admit air into the firing chamber 12. Air supply "back pressure" is directed through passages 52 an controlled with back pressure adjustment screws 66 before reaching the front face of piston 38. Under these circumstances, the back pressure tends to close the main air valve 34. Further back pressure control is similarily obtained with back pressure relief ports 68.

The electromagnetic control system 18 of the present invention is designed to interconnect with the valving system 16. Specifically, electromagnetic voice coils 56 are connected to T-member 70. T-member 70 extends from the voice coils and is fastened to piston 38. Voice coils 56 are connected to a source of suitably amplified electrical signal impulses, such as an amplifier and microphone, through electrical lines C and D. Voice coils 56 are electro-acoustic instruments that carry the audio frequency current signal corresponding to input sound waves. This current flow through the voice coils generates electromagnetic signal fields similarly corresponding to sound waves. In their application as in the present invention, these voice coils 56 and associated electromagnetic signal fields serve to impart movement to valving system 16.

Movement is imparted to voice coils 56 through the interaction of voice coils 56 with magnetic field windings 72. A second electromagnetic field is created by electrical current flow through magnetic field windings 72. Magnetic field windings 72 are supplied with electrical energy through electrical lines A and B. Electrical lines A and B may be supplied with power through a suitable A.C. or filtered D.C. power supply. The magnetic field windings 72 are maintained in their proper positions within a housing 74. The relationship of the magnetic field windings 72 with voice coils 56 permits interaction of the two opposing electromagnetic fields such that relatively large amounts of movement are imparted to the voice coils 56 in relationship to the magnitude of the electrical signal impulses acting on the voice coils.

In order to allow the present invention to operate for long periods of time, it is necessary to suitably control the temperature of the system. Without appropriate cooling means, the constant firing within the firing chamber 12 along with the constant application of electromagnetic energy within housing 74 creates huge amounts of heat within the sound engine. Therefore, in order to remedy the problem, various coolant systems are maintained about the sound engine. Coolant distribution system 28 is maintained generally adjacent the valving systems 16 and the firing chamber 12 of the present invention. Coolant is transmitted into the distribution system 28 through coolant entry line 80. The coolant passes through entry line 80, passes through coolant passageways 82, and exits into coolant collection manifold 84. Coolant collection manifold seal rings 86 are maintained generally about the firing chamber so as to retain the coolant thereabout. The coolant then exits from about the firing chamber through coolant discharge piping 88. Appropriate sensors may be positioned generally about the firing chamber so as to continually monitor the temperature of the firing chamber. These sensors may then be connected, by appropriate means, to control systems for regulating the flow of coolant through the second engine in relation to the heat generated therein. Through the use of coolant system 28, the overheating problems of previous sound engines can be overcome.

The voice coils 56 and the electromagnetic field windings 72 are also equipped with cooling systems. Large amplitudes and continued engine operation require the use of these cooling features in order to avoid disastrous overheating. The electromagnetic field windings 72 may be cooled by introducing an electrically nonconducting coolant through lines 90, entering windings area through ports 92, flowing over windings 72 and further flowing through ports 94 into an annular collection area 96. The coolant then exits through discharge line 98.

The electromagnetic voice coil windings 56 may also be cooled as required. Coolant enters through a line 100 at the back of the sound engine, flows through a central passage in the electromagnet rear core 102, and passes to a series of passages 104 in the electromagnet front core 106. The coolant exits into the annular collection area 96 from the electromagnetic controls while passing over the voice coils 56. In addition to the cooling benefits of passages 104, friction between the voice coils 56 and the electromagnet front core 106 is minimized by introducing air or other suitable fluid through line 100 as described hereinbefore.

While the present invention, as illustrated in FIG. 1, appears to be a single unit, it should be kept in mind that the present invention can be arranged as a plurality of sound engines. A great variety of suitable arrangements can be adopted so as to incorporate a plurality of the arrangement shown in FIG. 1 within a single structure. For example, a suitable design might incorporate three firing chambers, arranged symmetrical to each other, within a single, circular housing. The benefits of such an arrangement would be the maximizing of the sound output while elminating many, potentially duplicative arrangements of the devices wihtin a single sound engine arrangement. A single cooling system could be adopted to circulate fluid throughout all three engines in a single housing. It should be kept in mind that the illustration as seen in FIG. 1 is but one embodiment of the potential design of the present invention.

FIG. 2 presents an illustration of a typical horn 150 that may be attached to flanged connection section 26 of sound engine 10. The horn 150 as shown in FIG. 2 is similar to the typical output horn for a general purpose loudspeaker. Horn 150 comprises a compressor tube 152 which fits inside the combustor discharge sleeve 24 and into the firing chamber 12 of the sound engine 10. This compressor tube is provided with an opening for the discharge of generated explosive sound output and combustion byproducts. A mounting flange 154 is affixed to the exterior of compressor tube 152. Mounting flange 154 is designed to fit with and attach to the mounting flange 26 of sound engine 10. Suitable attachment means, such as nuts and bolts, may be fitted to these mounting flanges 26 and 154 so as to secure the horn 150 to the output area 20 of sound engine 10. Horn 150 also includes the output horn proper 156 which is connected to, extends from, and opens from compressor tube 152. Output horn proper 156 serves to magnity or otherwise control the pitch and tone of the sound emitted from firing chamber 12. For various acoustic purposes, sound reflector 158 and associated sound reflector mounting braces 160 are arranged about the opening 162 of horn 150. It should be kept in mind that the sound engine 10 of the present invention is adaptable to receive a variety of different sizes, shapes, and arrangements of horn 150. The shape and configuration of horn 150, as shown in FIG. 2, is but one embodiment of the types of horns that could be received by the sound engine.

FIG. 3 illustrates the igniter firing control circuit that is associated with igniter 14 and the phototransistor within port 32. A suitably amplified analog signal is input to terminals X and Y by suitable means, such as an amplifier and a microphone. This signal is directly transferred to the voice coils 56 through terminals C and D. As illustrated, the terminals C and D of FIG. 3 are directly connected to the respective lines C and D associated with voice coils 56 in FIG. 1. Additional lines are connected so as to receive the signal as passed by terminals X and Y. These lines extend into firing control circuitry 200. Firing control circuitry 200 can be a microprocessor or any other system for appropriately analyzing and processing input signals. Firing control circuitry 200 is powered by an alternating current power supply 202. The phototransistor 204 that is installed in port 32 of sound engine 10 serves as another input to the firing control circuitry 200. This phototransistor 204 is installed so as to view the firing chamber 12. In this manner, the firing of igniter 14 and the associated explosions are continually monitored by the firing control circuit 200. The firing control circuitry then produces an output signal relative to its analysis of the inputs from the analog signal from terminals X and Y and the inputs from phototransistor 204. This output signal then acts on high voltage coil 206. High voltage coil 206 then delivers a charge to igniter 14 suitable for firing the igniter. This firing signal passes through terminal E of FIG. 3 and through line E of FIG. 1 to the igniter (or spark plug) 14. In this manner, the ignition of the fuel/air mixture within the firing chamber 12 will occur at an appropriate point in time relative to the sound input signal. Coil 206 and firing control circuitry 200 are remotely connected by electric lines to the sound engine 10.

The operation of the present invention is described hereinafter. Initially, the sound engine 10 is in its dormant condition. This means that igniter 14 is inoperative, there is no fuel within firing chamber 12, and there are no electrical impulses acting on voice coils 56. In this state, the fuel shuttle valve 36 is positioned so as to close off the areas that receive and transmit fuel from fuel lines 40. No fuel passes through fuel passage 42 and fuel injection tip 44. Also in this initial state, the preset relative location of air valve 34 and fuel shuttle valve 36 and appropriate air "back pressure" (discussed earlier) adjustments made by means of adjusting screws 66 and back pressure relief ports 68, the air valve 34 may remain closed so that no air flows into the firing chamber 12. Alternatively, these settings may be changed such that a desired flow of air is admitted into the firing chamber while no fuel flow is permitted. By the above means the air valve 34 may be biased to flow a required quantity of air in the initial state.

When initially activated, the electromagnetic field windings 72 are charged with the electricity passing through lines A and B. Similarily, the various coolant systems of the sound engine are activated as required so as to pass cooling fluid throughout. Igniter 14 may be actuated, as the need may be, but only minimal sounds will be emitted by the sound engine since the proper fuel/air mixture is not presented to firing chamber 12.

Upon the receipt of an electrical impulse through lines C and D, voice coils 56 will activate so as to impart movement onto T-member 70. T-member 70 will similarly impart movement onto piston 38, fuel shuttle valve 36, and air valve 34. Through this slight movement, air, or additional air if the system is biased as mentioned, will pass from passageway 52, into air chamber 64, and past valve 34. In this manner, air (preferably oxygen) is introduced into firing chamber 12. Also, through the motion of the fuel shuttle valve 36, fuel passes from fuel lines 40 into fuel passageway 42, and into combustion chamber 12. This allows fuel and air to mix creating a combustible fuel/air mixture within combustion chamber 12. Upon activation of igniter 14 through line E, an explosion will occur in firing chamber 12. This explosion creates an enormous sound wave that passes from the combustion chamber 12 outwardly through sound output area 20. This sound output can be magnified, altered, or otherwise varied through the use of a horn 150 mounted to mounting flange 26. The choice of horn for modifying the sound emitted will be a matter of design choice by those utilizing the sound engine.

As input electrical signal impulses continually act on voice coils 56, the valving system 16 will similarly vary the amount of the fuel/air mixture in correspondence therewith. For example, if a large amplitude signal corresponding to a loud sound is acting on voice coils 56, a greater amount of the fuel/air mixture will be emitted into the firing chamber. Thus, a louder explosion will occur within the firing chamber and a louder sound resulting therefrom. The volume of the sound may also be further amplifed through the use of different types of gases, such as hydrogen, pure oxygen or other gaseous substance at higher inlet pressures. The tonal qualities of the sound can be varied by changing the firing frequency within the firing chamber. The firing frequency should correspond to the frequency of the input sound waves.

As stated in the summary of the invention, the present invention has a wide variety of commercial and industrial applications. Similarily, with proper adjustment, the sound engine of the present invention can be adaptable as a musical instrument in much the same manner as described in U.S. Pat. No. 4,356,753. Of course, the uses and applications will vary in accordance with the circumstances in which it is employed.

The embodiment as illustrated and discussed in the specification is intended only to teach those skilled in the art the best way known by the inventor to make and use the invention. Nothing in the specification should be considered as limiting the scope of the present invention. Many changes could be made by those skilled in the art to produce equivalent systems without departing from the invention. The present invention should only be limited by the following claims and their legal equivalents.

I claim:

1. A sound engine comprising:
- a firing chamber having a sound outlet;
- igniting means mounted to said firing chamber;
- valve means mounted to said firing chamber, said valve means permitting the controlled introduction of a fuel and a gas to said firing chamber, said valve means comprising:
  - an air valve fitted to an opening adjacent said firing chamber, said air valve movable relative to said opening;
  - a fuel shuttle valve connected to said air valve such that movement of said air valve imparts a movement to said fuel shuttle valve; and
  - blowback control means attached to said firing chamber said blowback control means including a piston fastened to said fuel shuttle valve, said blowback control means for equalizing pressures acting on said air valve;
- electromagnetic means connected to said valve means;
- a source of electrical signal impulses connected to said electromagnetic means, said electromagnetic means for causing movement of said air valve and said fuel shuttle valve, said air valve and said fuel shuttle valve moving in correspondence to said electrical signal impulses; and
- output means connected to said sound outlet to provide a sound output from said firing chamber.

2. The apparatus of claim 1, said firing chamber including coolant means fastened to said firing chamber for controlling the temperature of said firing chamber.

3. The apparatus of claim 1, further comprising a horn demountably connected to said output means, said horn providing a sound output of a predetermined pitch from said firing chamber.

4. The apparatus of claim 1, said firing chamber further comprising:
- a phototransistor mounted to the interior of said firing chamber;
- processor means connected to said phototransistor and to said igniting means, said processor means for actuating said igniting means relative to the signals as generated by said phototransistor.

5. The apparatus of claim 1, said electromagnetic means comprising:
- a voice coil connected to said valve means, said voice coil being responsive to said source of electrical signal impulses.

6. The apparatus of claim 5, said electromagnetic means further comprising:
- cooling means coupled to said voice coil, said cooling means for controlling temperatures about said voice coil.

7. The apparatus of claim 1, further comprising:
- microprocessor means connected to said source of electrical impulses and to said igniting means, said microprocessor means for transmitting a signal to said igniting means relative to said source of electrical impulses.

8. The apparatus of claim 1, further comprising:
- an enclosure generally surrounding said firing chamber and said valve means, said enclosure including attachment sections connected to said output means for receiving devices for the control of sound output.

9. A sound engine comprising:
- a firing chamber having a sound outlet;
- igniting means mounted to said firing chamber;
- valve means mounted to said firing chamber, said valve means permitting the controlled introduction of a fuel and a gas to said firing chamber, said valve means comprising:
  - an air valve fitted to an opening adjacent said firing chamber, said air valve movable relative to said opening;
  - a fuel shuttle valve connected to said air valve such that movement of said air valve imparts a movement to said fuel shuttle valve; and
  - back pressure control means coupled to said air valve, said back pressure control means including a passage extending within said valve means between said air valve and a piston fastened to said fuel shuttle valve, said back pressure control means for equalizing gas pressures within said valve means;
- electromagnetic means connected to said valve means;
- a source of electrical signal impulses connected to said electromagnetic means, said electromagnetic means for causing movement of said air valve and said fuel shuttle valve, said air valve and said fuel shuttle valve moving in correspondence to said electrical signal impulses; and
- output means connected to said sound outlet to provide a sound output from said firing chamber.

* * * * *